United States Patent [19]

Chiapale et al.

[11] 4,215,672
[45] Aug. 5, 1980

[54] METHOD AND AN INSTALLATION FOR THE AIR-CONDITIONING OF GREENHOUSES AND FRAMES

[75] Inventors: Jean-Pierre J. Chiapale, Le Pontet; Jacques A. Damagnez, Villeneuve-les-Avignon; Pierre M. Denis, Grenoble; Paul Jourdan, Meylan, all of France

[73] Assignees: Commissariat a l'Energie Atomique; Institut National de la Recherche Agronomique, both of Paris, France

[21] Appl. No.: 860,443

[22] Filed: Dec. 14, 1977

Related U.S. Application Data

[62] Division of Ser. No. 577,358, May 14, 1975, Pat. No. 4,108,373.

[51] Int. Cl.³ .......................... A01G 9/00; F24J 3/02
[52] U.S. Cl. ........................................ 126/419; 47/17; 126/431
[58] Field of Search .......................... 47/17; 237/1 A; 126/270, 419, 437, 431; 52/2

[56] References Cited

U.S. PATENT DOCUMENTS 3,889,742  6/1975  Rush et al. .......................... 237/1 A

FOREIGN PATENT DOCUMENTS 550914  12/1959  Belgium ........................................ 47/17
1148970  4/1969  United Kingdom ..................... 237/1 A

*Primary Examiner*—William E. Wayner
*Attorney, Agent, or Firm*—Lane, Aitken, Ziems, Kice & Kananen

[57] ABSTRACT

Solar radiations having longer wavelengths than those which are useful for plant development are selectively absorbed by an optical filter formed by two transparent walls which constitute at least part of the roofing structure of a greenhouse or "lean-to" frame and by a heat-transporting fluid which is circulated between the walls in a closed-circuit system. The heat absorbed is removed and stored in a separate reservoir, then recovered at night by pumping and circulating the fluid so as to maintain a predetermined minimum temperature within the greenhouse.

17 Claims, 7 Drawing Figures

METHOD AND AN INSTALLATION FOR THE AIR-CONDITIONING OF GREENHOUSES AND FRAMES

This is a division, of application Ser. No. 577,358 filed May 14, 1975, now U.S. Pat. No. 4,108,373.

This invention relates to a method and an installation for the air-conditioning of greenhouses and frames.

In northern regions, the light intensity of the atmosphere is often a factor which limits agricultural or horticultural production in greenhouses and frames in spite of the presence of heating installations. On the other hand, in more privileged regions which have longer periods of winter sunshine and especially in countries of the Mediterranean belt and arid regions in the vicinity of these countries, these means of plant cultivation are being developed to a remarkable extent.

In parts of the world which have the benefit of a sunny winter climate, the intensity of solar radiation increases to such an extent that it proves necessary to limit temperature build-up within greenhouses and frames during the hottest hours of the day and accordingly to make use of large and efficient ventilation systems. Known systems include outwardly-opening roof windows of the skylight type for glass-roof greenhouses and the wetted-wall heat-exchanger cooling systems in the case of frames. In practice and in spite of the improvement achieved by the use of ventilating and cooling systems, the temperatures attained by the addition of solar energy become critical in the case of many cultivated species and detrimental to the growth and development of plants.

Furthermore, it is known that the cultivation of plants calls for the utilization of wavelength bands located in the near ultraviolet and visible region. The supply of energy in the near infrared in particular only serves to increase the temperature of the plant cover in greenhouses and frames as well as to increase the water consumption of plants under cultivation whereas natural water resources are rare in dry and arid regions.

On the other hand, the climatic conditions of these regions (continental climates characterized by a substantial range of temperature variations and violent winds) are such that heating requirements during the night remain relatively considerable. In the case of intensive production in greenhouses and frames, air-conditioning systems frequently have power ratings which are comparable with those encountered in regions which are located farther north but have a temperate oceanic climate.

One aim of the present invention is to overcome these disasdvantages and to utilize the energy supplied by the sun in such a manner that the penetration of solar energy by absorption is selectively limited during the daytime whilst the remainder of the energy which has thus been stored can be restituted during the night for heating purposes in accordance with requirements.

If the temperature of the walls can be maintained at a value below that of the plant cover and below that of the internal ambient temperature, a regime of transfer of latent heat can be established between said walls and the plant cover and it accordingly becomes possible to recover this energy within the walls.

Furthermore, the evaporation and transpiration of the plant cover which are proportional in a first approximation to the solar energy received and correspond to a consumption of water supplied in the form of irrigation can be recovered by the water which streams down the walls on condition that the surfaces of these latter are designed for this purpose.

Moreover, it is known that the growth of plants is seriously disturbed when the radiative temperature exceeds a maximum permissible limit which varies according to the plants cultivated but is of the order of 35° and 40° and also when the radiative temperature falls below a minimum permissible limit which is of the order of 7° to 15°, depending on the species under cultivation.

It is also known that, in the case of plants which have a normal development, the radiative temperature of the plant cover must not be too uniform. Thus it must follow daily cycles during which a minimum difference of the order of 20° between the daytime and night-time radiative temperatures must be maintained.

It is recalled that the radiative temperature of the plant cover is different from the temperature of the atmosphere within the enclosure and that different known means are employed in order to measure said radiative temperature such as infrared radiothermometers, thermocouples placed in contact with the leaves or actino-thermal index detectors.

To this end, the invention proposes a method of day and night air-conditioning of an enclosure in which plants are cultivated, at least part of the roofing of said enclosure being made up of at least two transparent walls delimiting an intermediate space which is filled with a heat-transporting liquid, characterized in that:

- during the daytime, the penetration of the solar energy within said enclosure is selectively limited by making use of an optical filter constituted by said walls and said liquid in order to provide selective absorption of those radiations whose wavelength is longer than that of the radiations which are useful for the growth of the plants,

- during the daytime, the heat absorbed is removed by circulating said liquid in a closed circuit and is stored in a reservoir which is separate from the space formed between said walls,

- during the night, a minimum temperature is maintained within the enclosure by circulating said liquid within said intermediate space.

The heat stored during the daytime by the heat-transporting fluid can be restituted at night. In the event that the reserve supply of heat proves insufficient, provision can be made for auxiliary heating of the heat-transporting fluid.

By means of this method, it is possible to provide adaptation to the natural conditions of energy supply by the solar radiation which is non-continuous.

In accordance with a preferred variant of the method, and radiative temperature of the plant cover within the enclosure is measured, there is determined a top threshold value of said radiative temperature which is slightly lower than the maximum permissible light and a bottom threshold value which is slightly higher than the minimum permissible limit, the heat-transporting liquid is circulated during the daytime as long as said radiative tempertaure exceeds said top threshold value and the heat-transporting liquid is circulated during the night as long as said radiative temperature is lower than said bottom threshold value.

To this end, the invention also extends to an installation for carrying out the method aforementioned and which comprises in combination on the one hand an enclosure in which at least part of said enclosure is composed of at least two transparent walls delimiting at least one intermediate space filled with a heat-transporting liquid, said walls and said liquid being such as to constitute an optical filter which absorbs the radiations having a wavelength of higher value than a threshold within the range of 6000 Å and 7500 Å according to the plants under cultivation and, on the other hand, a closed circulation system comprising said intermediate space or spaces, a heat-storage reservoir which is separate from said circulation system and a pump.

Since the useful wavelengths for photosynthesis, growth and development of plants are all located in the visible region of the spectrum, an advantageous feature of the invention lies in the fact that said double wall comprises at least one wall which is an optical filter.

In accordance with this feature and in view of the known fact that the quantitative requirements of plants in the region of 6000–7500 Å are relatively small, it is therefore possible to contemplate the use of filters which progressively absorb the incident solar energy between 6000 and 7500 Å and to have opaque filters beyond these values. The absorbent filter undergoes a temperature rise and the heat is removed by the heat-transporting fluid.

In accordance with another feature, said enclosure comprises a transparent double wall and a heat-transporting fluid having the properties of an optical filter.

The heat-transporting fluid is a liquid. In the liquid state, a solution of copper chloride in water in a proportion of 25 g/liter gives excellent results. An addition of absorbent substance makes it possible to endow the heat-transporting fluid with the properties of an optical filter.

The means for circulating the heat-transporting fluid are connected to the storage means by a programmable control pump.

During the daytime, the pump draws-off the heat-transporting fluid which has absorbed the heat extracted from the double wall and introduces said fluid into a heat-insulated reservoir. During the night, the pump draws-off the heat-transporting fluid at a high relative temperature and introduces it into the double wall in order to heat the enclosure. Operational control takes place as a function of the optimum conditions required for good growth of plants and as a function of rational use of the available solar energy.

During the night, the installation can be protected against excessive losses by heat exchanges in contact with the atmosphere by employing reflecting insulating surfaces which correspond to the thermal wavelengths.

In another embodiment, the installation comprises an enclosure in which at least part of the roof structure is made up of three transparent walls delimiting between them to intermediate spaces in which a heat-transporting liquid is circulated, the central wall being intended to constitute an optical filter which absorbs those radiation whose wavelength exceeds a threshold value within the range of 6000 Å to 7500 Å, depending on the plants under cultivation.

Provision is preferably made for means whereby the heat-transporting liquid contained in the external intermediate space is removed during the night and when the wind is blowing at a velocity which exceeds a predetermined value.

In accordance with a preferred feature, the roof structure is made up of recessed panels at least in that portion which is directed towards the sun, said panels being formed of transparent plastic material and placed in end-to-end relation so that the recesses constitute ducts in which a heat-transporting liquid is circulated.

In this case, said ducts are connected in parallel to a supply collector and to a return collector forming part of a closed-circuit system comprising a heat-storage reservoir and a pump.

At least in that portion which is directed towards the sun, the roof structure is composed of at least two superposed layers of transparent recessed panels in which said heat-transporting liquid is circulated and between which is intercalated a layer forming a filter which selectively absorbs radiations having a wavelength which exceeds a threshold value within the range of 6000 Å to 7500 Å, according to the species under cultivation.

The following description relates to non-limitative examples of construction, reference being made to the accompanying drawings in which.

Figure 1:
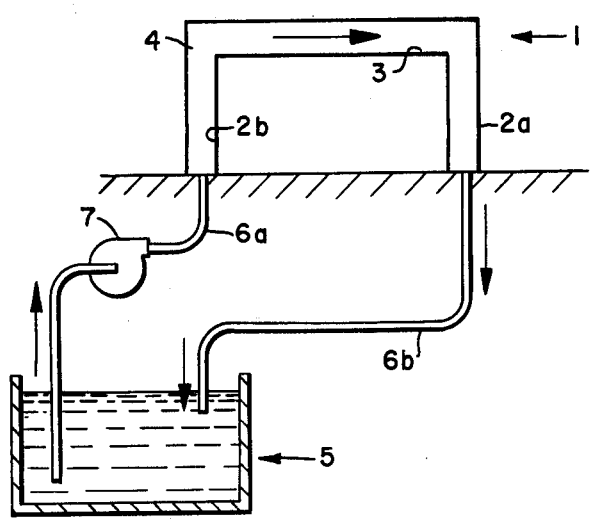
FIG. 1 is a diagram which serves to explain the method according to the invention.

In FIG. 1, the reference numeral 1 shows diagrammatically the enclosure of a greenhouse or of a frame provided with a double wall 2 in which the reserved or interstitial space 3 between the single walls 2a, 2b is provided with a circulation of heat-transporting fluid 4. Said fluid circulates in a closed circuit between the enclosure 1 and a reservoir-tank 5 by means of pipes 6a, 6b and of a pump 7.

By reason of the climatic conditions existing in certain areas and especially continental climates which are characterized by a substantial amplitude of temperature variations and violent wind as mentioned earlier, it is known that the resultant intensity of solar radiation makes it necessary to limit the temperature build-up within enclosures used for the cultivation of plants and that the temperature drop which occurs at night entails the need to provide for relatively powerful heating during the night.

In order to utilize the energy supplied by the sun and to recover this energy for the purpose of either cooling or heating greenhouses and frames, the method in accordance with the invention makes it possible during the daytime to maintain the temperature of the walls 2a, 2b of the enclosure 1 at a value corresponding to the quantitative requirements of plants by making use of a heat-transporting fluid 4 in order to absorb in such a manner as to ensure that the temperature reached within the enclosure 1 is not critical for the plants under cultivation. During the night, the temperature of the walls 2a, 2b which radiate on the plants is fixed by recovering the heat stored during the day by the heat-transporting fluid 4.

Figure 3:
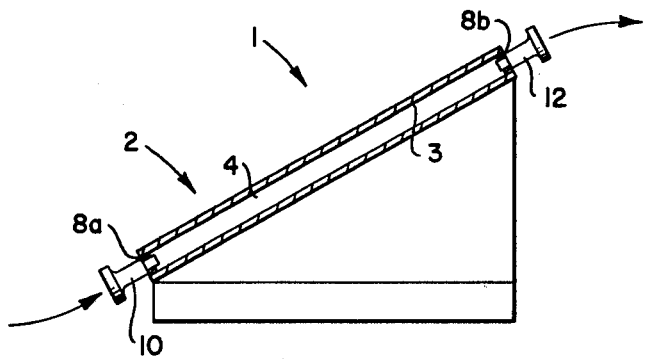
FIG. 3 shows one form of construction of a frame in accordance with the invention.

The inventional also applies to an installation for carrying out the method according to the invention as illustrated in FIG. 3 in which a frame 1 is shown diagrammatically in cross-section.

The double wall 2 is formed by the two single walls 2a, 2b, said walls being separated by an interstitial or empty space 3 and the edges 8a, 8b of said walls being made leaktight by means of devices which do not form part of the invention. Pipe connections 10 and 12 serve to admit and discharge the heat-transporting fluid 4 which circulates within the space 3 as shown in the diagram of FIG. 1.

In accordance with one advantageous feature of the invention, both walls 2a, 2b or only one of these latter such as the wall 2a, for example, can be constructed of a material which has the properties of an optical filter in order to eliminate the supply of energy in the near infrared region which has the contributory effect of increasing the temperature of the plant cover within the enclosure. It is in fact known that, in order to promote their development, plants utilize only specific wavelength bands which are located in the near ultraviolet and visible region.

Figure 2:
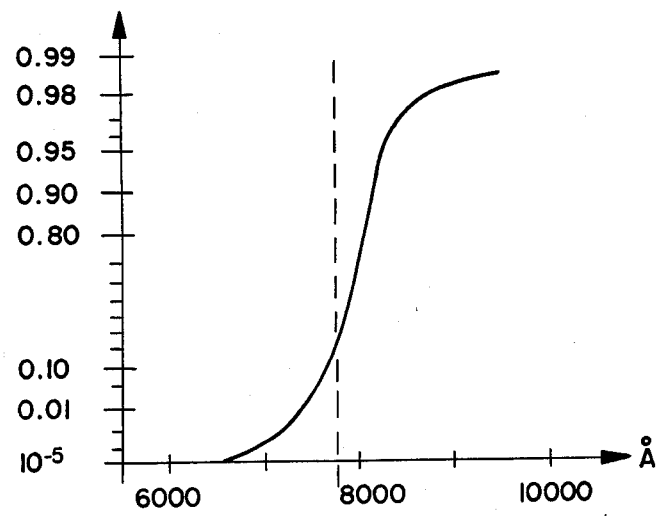
FIG. 2 is a diagram of the absorption spectrum of a commercially available filter which is adapted to the invention.

The walls 2a, 2b of the double wall 2 can be made of special glass which is commercially available, one type of which is manufactured by the German company known as Schott and has optical properties which permit absorption of infrared radiation between 6000 and 7500 Angström and beyond. FIG. 2 represents a diagram of the transmission spectrum for this type of filtering glass in which the radiation wavelength in Angström is plotted as abscissae and the absorption through the filter is plotted as ordinates. It would also be possible to employ transparent plastic materials or materials having the same optical properties as the filtering glasses.

The materials employed can also be those manufactured by the Schott Company under the references KG1, KG3 and BG 38, by the Corning Company under the references 1-56, 1-57 and 1-58 or by Societe Metallisation et Traitements Optiques (S 790, S 760, S702, S 701, DS 700, DL 665 and DH 543).

In accordance with a feature of the invention which is also of interest, advantageous use can be made of an enclosure having a transparent double wall and a heat-transporting fluid having the properties of a filter.

The heat-transporting fluid is in that case a liquid filter; very good results have been obtained from a solution of copper chloride in water with a proportion of 25 g/liter.

It is also possible to employ nickel salts in aqueous solution such as chlorides, for example.

The addition of absorbent substances endows the heat-transporting fluid with the properties of an optical filter.

The circulation of the fluid is maintained by means of a pump such as the programmable control pump 7 shown in FIG. 1 which takes into account the optimum conditions required for good growth of plants and rational use of the available solar energy. In particular, the enclosure can comprise thermoelectric transducers which serve to control the delivery of the pump 7.

By way of example, during the daytime, the pump 7 causes the heat-transporting fluid 4 which has absorbed heat to circulate within the internal space 3 of the double wall 2 and stores said heat within a heat-insulated reseervoir 5 (shown in FIG. 1). During the night, the pump 7 withdraws the heat-transporting fluid 4 at a relatively high temperature from the reservoir 5 and introduces said fluid into the space 3 in order to heat the enclosure 1.

It is readily apparent that the recovery of heat by the heat-transporting fluid 4 could be employed at least partially for other purposes without changing the scope of the present invention.

Figure 4:
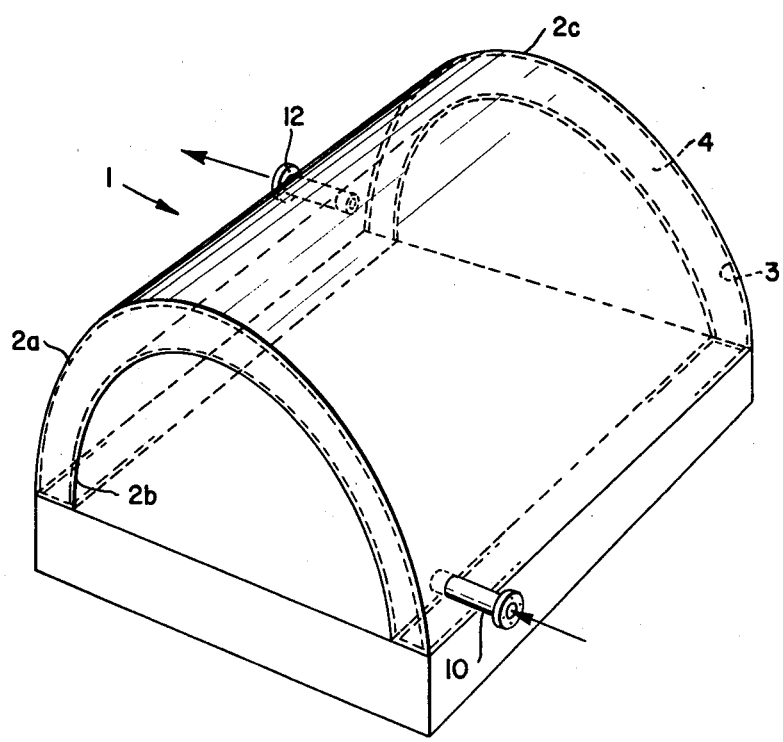
FIG. 4 is another form of construction applied to a greenhouse.

FIG. 4 illustrates another example of enclosure 1 which is applicable to a greenhouse. In this example, the double wall 2 is curved so as to form the creat 2c; the supply and discharge of heat-transporting fluid 4 take place within the internal space 3 by means of pipe connections 10 and 12 respectively. Construction and sealing means which do not form part of the present invention are provided for assembling the double wall 2 of FIG. 4.

In order to avoid excessive losses arising from radiative and convective heat transfer with the atmosphere, the enclosure 1 can be protected by employing insulating and reflecting surfaces applied against the double wall (not shown in the figure) which correspond to the thermal wavelengths.

Figure 5:
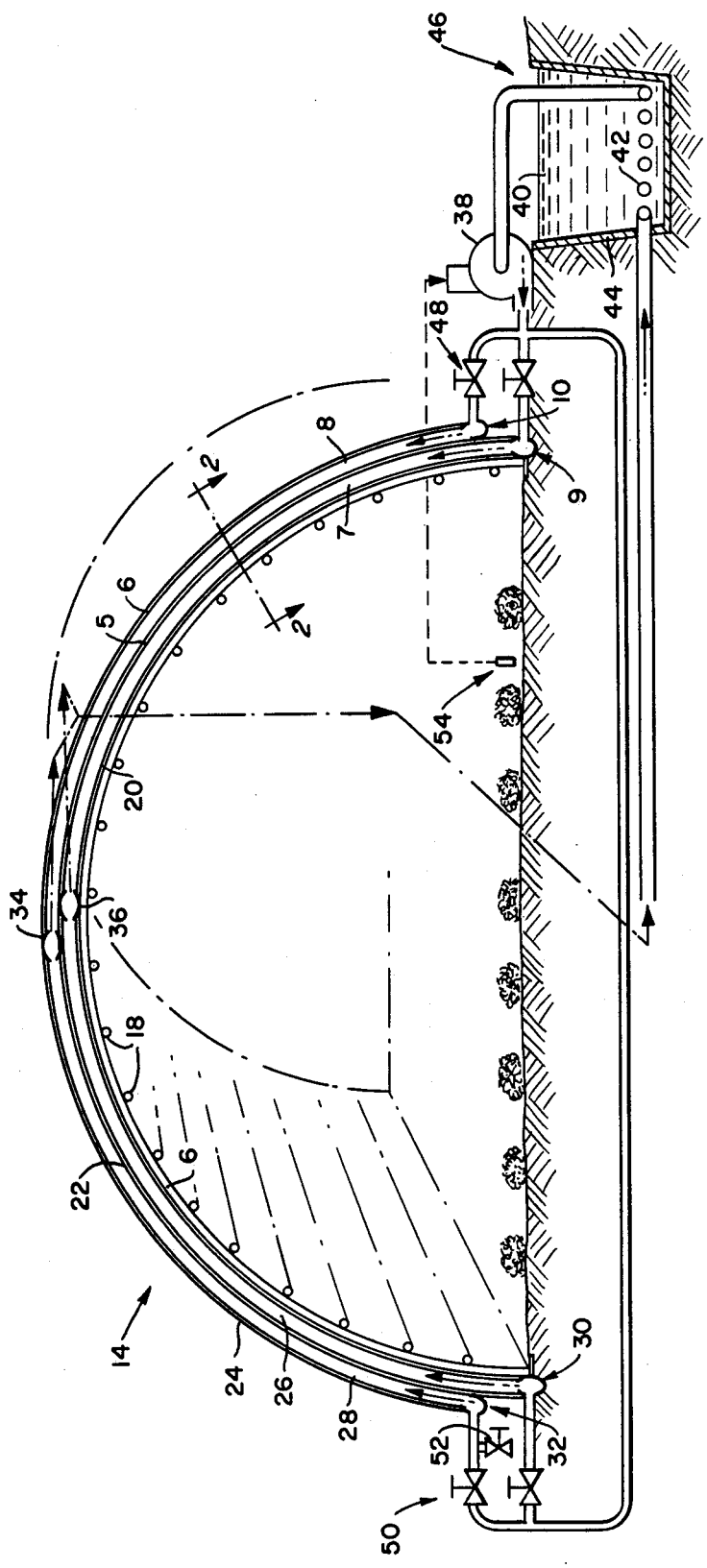
FIG. 5 shows one form of construction of the installation in which the roof structure has three walls.

FIG. 5 represents another form of construction of the installation cofmprising a greenhouse 1 delimited by a structural framework formed by curved tubes 16 which are connected to each other by means of spacer members 18. On this frame is placed a roof structure composed of three concentric walls, namely an internal wall 20, a central wall 22 and an external wall 24. An internal compartment 26 is formed between the walls 20 and 22. An external compartment 28 is formed between the walls 22 and 24.

The compartments 26 and 28 can be single or else divided into a plurality of juxtaposed compartments. Each compartment can occupy the entire periphery of the roof structure as shown in FIG. 5 or only that portion of the roofing which is directed towards the sun.

Each compartment is connected to a supply collector 30 and 32 respectively and to a return collector 34 and 36 respectively. These collectors form part of a closed circuit system comprising a circulating pump 38 and a storage reservoir 40. In this manner, the introduction of heat-transporting fluid takes place through the bottom of the greenhouse whilst the withdrawal of said fluid takes place at the top of this latter; an upward circulation of the heat-transporting fluid accordingly prevents the formation of air bubbles which would be liable to reduce the transmission of light. A heat-transporting liquid circulates within said closed circuit system. Said liquid can consist of the liquid contained in the reservoir 40 or else, as shown in FIG. 5, can consist of a liquid circulated within a heat-exchanger 42 which is placed within the reservoir 40. The second of these two alternatives is preferable when the liquid is an absorbent copper chloride solution.

By way of example, the reservoir 40 consists of a pit formed in the ground, the walls of said pit being provided with a leak-tight lining 44 which can provide good heat insulation at the same time.

A cover 46 such as, for example, a plastic film or substances which float on the surface of the water serves to reduce evaporation and resultant heat losses.

By way of alternative, the pit 40 can be placed inside the greenhouse 14. The volume of the pit 40 is distinctly larger than the volume of the compartments 26 and 28. For example, if the greenhouse 14 has a width of 8 meters and a length of 100 meters and the compartments 26 and 28 each have a thickness of 1 cm, the overall volume of the compartments 26 and 28 is 24 m$^3$ and the pit 40 has a volume of at least 50 m$^3$. In consequence, the temperature variations of the heat-transporting liquid are three times smaller than would be the case if no pit were provided. Remotely operated valves 48, 50 make it possible to interrupt the supply to the external compartment and a remotely operated drain valve 52 serves to empty this latter.

A transducer 54 of any known type (or a number of transducers) serves to measure the radiative temperature of the plant cover in the greenhouse. By way of example, said transducer is an infrared radiothermometer or alternatively a thermocouple placed in contact with the leaves of the plants or else an instrument for measuring the actino-thermal index. Said transducer controls the circulating pump 38 as will be explained with reference to FIG. 7.

The walls 20 and 24 are transparent whilst the central wall 22 selectively absorbs the infrared radiations which are not necessary for the cultivation of the plants, that is to say radiations which exceed a threshold value within the range of 6000 Å to 7500 Å, depending on the species of plants. The heat-transporting liquid is water. By way of afternative, the compartments 26 and 28 are connected to two separate closed-circuit systems each provided with a circulating pump. The fluid circulated within the external compartment 28 is water whilst the fluid circulated within the internal compartment 26 is an absorbent aqueous solution such as a copper chloride solution, for example, the concentration of which varies between 5 g and 15 g per liter of water for a depth of water of 1 cm.

This alternative form of construction has an advantage in that the greenhouse can readily be adapted to crops. For example, the central wall 22 absorbs all infrared radiations having a wavelength which exceeds 7000 Å and the upper limit above which absorption takes place can be modified by varying the composition and concentration of the heat-transporting liquid which circulates within the compartment 26. The concentration of the copper chloride solution employed in this case is lower than when the entire selective absorption is obtained solely by means of the heat-transporting liquid.

The operation of the greenhouse in accordance with FIG. 5 is described in the following paragraph.

During the night and also during windy days, the compartment 28 is kept empty whilst a heat-transporting liquid is circulated within the compartment 26 for a certain number of hours of the day and of the night. During days when there is little wind, the heat-transporting liquid is circulated within the compartments 26 and 28 at the same time during the sunny hours of the day.

Figure 6:
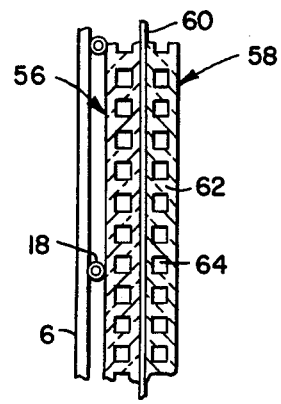
FIG. 6 is a part-sectional view taken along line II—II of FIG. 5.

FIG. 6 shows in partial cross-section a particular form of construction of the greenhouse roof structure. There can be seen in this figure two arches 16 connected together by means of a spacer member 18 which carries two superposed recessed panels 56 and 58 between which is placed a layer 60 of material which selectively absorbs the light radiations above a threshold value within the range of 6000 Å to 7500 Å, depending on the plant species which are placed in the greenhouse.

The layer 60 is either a filtering sheet placed between the two panels or a coating such as, for example, an absorbent paint applied to ione or both faces of the two panels 56 and 58 which are in contact. The panels 56 and 58 are of transparent polymerizable resin such as, for example, methyl polymethacrylate or polyvinyl chloride.

Each panel has two flat faces joined together by partition elements 62 which form parallel ducts or recesses 64.

Said panels can readily be bent either in the cold or in the hot state and assembled in end-to-end relation by welding, bonding or any other suitable joining means so that the recesses which are placed in the line of extension of each other constitute channels in which the heat-transporting fluid circulates.

As will be readily understood, said recessed panels can also be employed for constructing roofs of greenhouses which have only two walls forming an intermediate space, in which case there will be only a single thickness of panels (for example the panel 56) covered externally by the layer 60.

The following description will give a detailed explanation of the alternative embodiment of the air-conditioning method in which the radiative temperature is taken into account.

Figure 7:
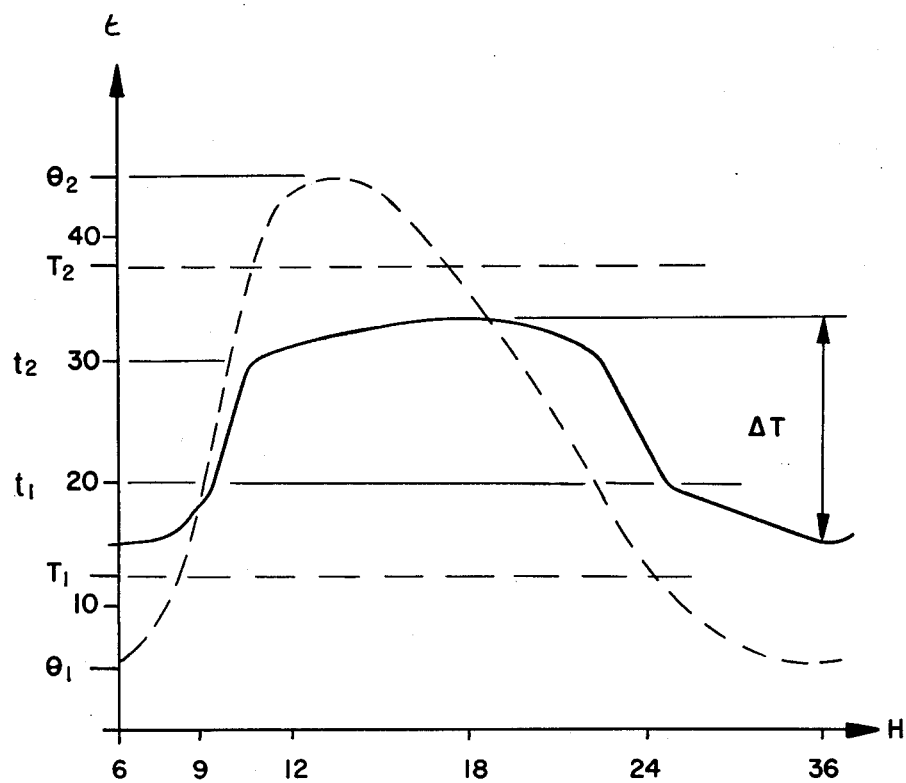
FIG. 7 is a diagram which provides an explanatory illustration of the method of air-conditioning.

FIG. 7 is a diagram showing the variations during 24 hours of the radiative temperature of the plant cover as measured by means of the transducer 54 of FIG. 5.

The dashed-line curve represents the temperature variations obtained in a conventional greenhouse whilst the full-line curve represents the temperature variations in an improved greenhouse in accordance with the invention.

In a conventional greenhouse, the lowest temperature $\theta_1$ is obtainedin the early morning, for example at 6 a.m. The temperature then rises rapidly and attains a maximum value of $\theta_2$ at 12 a.m. and then slowly decreases to the value $\theta_1$.

There is shown in this graph the minimum permissible limit $T_1$ and the maximum permissible limit $T_2$ of the radiative temperature of the plant cover. These limits are those beyond which the plant growth is sloweddown. If these limits are exceeded to any considerable extent, there is even a danger of irremediable accidents. These limits vary with the species. In the case of the majority of plants cultivated in temperate countries, the bottom limit $T_1$ is within the range of 7° to 15°. For the same species of plants, the top limit $T_2$ is between 35° and 40°. In order to obtain good plant growth, the temperature within the enclosure must always remain within the range of $T_1$ to $T_2$. However, this condition is not sufficient. A uniform temperature between $T_1$ and $T_2$ does not constitute a favorable condition for the development of plants. It is necessary to ensure in addition that the radiative temperature of the plant cover varies in such a manner as to follow a daily cycle during which a minimum difference $\Delta T$ of the order of 20° exists between day and night temperatures.

The method of air-conditioning in accordance with the invention makes it possible to achieve this result.

The temperatures $t_1$ and $t_2$ are two threshold values determined as a function of the plant species and therefore of the permissible limits $T_1$ and $T_2$, and also as a function of the greenhouse and of the thermal inertia of the installation. The threshold value $t_1$ is slightly higher than the limit $T_1$, and $t_1$ is chosen within the range of 15° to 20°, for example. The threshold value $t_2$ is slightly lower than $T_2$: for example, $t_2$ is within the range of 25° to 30°. In order to gain a clearer idea, it will be assumed that $t_1=20°$ and that $t_2=30°$.

The operation is as follows.

It is assumed that the time is 9 o'clock in the morning and that the pumps are stopped. The sun begins to heat the installation and the water contained in the compartments 7 and 8 undergoes a rapid temperature rise. The radiative temperature of the plant cover increases.

At about 11 o'clock, the temperature t attains the threshold value $t_2$ and the transducer 54 automatically initiates start-up of the circulating pumps 38. The heat-transporting liquid beings to circulate and to transfer the heat to the reservoir 40.

The greenhouse operates as a solar collector and the reservoir 40 operates as an accumulator or heat-storage device.

The radiative temperature of the plant cover within the interior of the greenhouse continues to rise under the action of non-absorbed solar radiations which penetrate into the greenhouse and under the effect of the very slow temperature rise of the heat-transporting fluid. At about 6 p.m., the radiative temperature attains a maximum value which is equal to 33° C., for example, and begins to fall more slowly than in a conventional greenhouse since the heat-transporting fluid continues to circulate. At about 10 p.m., the radiative temperature has fallen below the value $t_2$ and the transducer 54 stops the circulating pumps automatically. The radiative temperature then decreases at a higher rate. At about 12 p.m., the radiative temperature of the plant cover becomes lower than the bottom threshold value $t_1$. The transducer 54 automatically initiates start-up of the circulating pumps and the storage reservoir 40 operates as a radiator which transfers heat to the greenhouse. The radiative temperature t continues to fall but at a much lower rate up to about 6 a.m. and then begins to rise again after havng reached a minimum of 15° C., for example, if $t_1 = 20°$ C.

As soon as the temperature t exceeds $t_1$, the transducer 21 stops the circulating pumps automatically and a further cycle begins.

What we claim is:

1. An installation for the plant temperature control by radiant energy in an enclosure in which plants are cultivated, wherein said installation comprises in combination on the one hand an enclosure in which at least part of said enclosure is comprised of at least two walls delimiting at least one intermediate space filled with a heat-transporting liquid, each of the walls and liquid being at least partially transparent to solar radiation, one of the walls being formed of a material which contains an additive which operates to constitute an optical filter which absorbs radiant energy having a wavelength exceeding a threshold value lying within the range of 6000 Å to 7500 Å and having no usefulness for that growth of plants; and on the other hand a closed circulation system for circulating heat-transporting liquid to which heat absorbed by said one wall has been transferred, said system comprising said intermediate space or spaces, a heat-storage reservoir which is separate from said circulating system, and a pump means which includes means for determining a top threshold value of a radiative temperature which is slightly lower than the maximum permissible limit and a bottom threshold value which is slightly higher than the permissible limit, said pump circulating the heat-transporting liquid during the daytime as long as said radiative temperature exceeds the top threshold value and circulating the heat-transporting liquid during the night as long as the radiative temperature is lower than the bottom threshold value.

2. An installation according to claim 1, wherein said enclosure has walls with reflecting and insulating surfaces which correspond to the thermal wavelengths.

3. An installation according to claim 1, wherein provision is made within the interior of said enclosure for at least one radiative temperature transducer which controls said pump.

4. An installation according to claim 1, wherein said liquid is water containing copper chloride in solution in preferably a concentration of 25 g/l in respect of a depth of 1 cm of water.

5. An installation according to claim 1, wherein said top threshold value is within the range of 25° C. to 30° C. and said bottom threshold value is within the range of 15° C. to 20° C.

6. A method of day and night airconditioning of an enclosure in which plants are cultivated, at least part of the roofing structure of said enclosure being made up of at least two walls delimiting an intermediate space which is filled with a heat-transporting liquid, each of the walls and liquid being at least partially transparent to solar radiation, wherein:

(a) during the daytime, the penetration of the solar energy within said enclosure is selectively limited by making use of an optical filter constituted by one of said walls which is formed of a material which contains an additive for selectively absorbing all radiant energy of wavelengths exceeding a threshold value that lies within the range of 6000 Å to 7500 Å and having no potential usefulness for the productivity and growth of the plants, at the same time permitting the greater part of the solar radiant energy that is potentially useful to green plants to be absorbed by the leaves of the plants under cultivation.

(b) during the daytime, the heat absorbed by said one wall containing the additive is transferred to said liquid which is circulated in a closed circuit and is stored in a reservoir which is separate from the space formed between said walls, (c) during the night, a minimum temperature is maintained within the enclosure by circulating said liquid within said intermediate space, (d) measuring the radiative temperature of the plant cover within the enclosure, (e) determining a top threshold value of a radiative temperature which is slightly lower than the maximum permissible limit and a bottom threshold value which is slightly higher than the minimum permissible limit, and (f) circulating the heat-transporting liquid during the daytime as long as said radiative temperature exceeds said top threshold value and circulating the heat-transporting liquid during the night as long as said radiative temperature is lower than said bottom threshold value.

7. A method according to claim 6, wherein said liquid is water containing copper chloride in solution in preferably in a concentration of 25 g/l in respect of a depth of 1 cm of water.

8. A method according to claim 6, wherein said top threshold value is within the range of 25° C. to 30° C. and said bottom threshold value is within the range, of 15° C. to 20° C.

9. The method of claim 6, wherein a third wall is located within said intermediate space, the third wall being the one formed of the material which contains said additive.

10. An installation for the plant temperature control by radiant energy in an enclosure in which plants are cultivated, wherein said installation comprises in combination on the one hand an enclosure in which at least part of said enclosure is comprised of at least two walls delimiting at least one intermediate space filled with a heat-transporting liquid, each of the walls and liquid being at least partially transparent to solar radiation, one of the walls being formed of a material which contains an additive which operates to constitute an optical filter which absorbs radiant energy having a wavelength exceeding a threshold value lying within the range of 6000 Å to 7500 Å and having no usefulness for that growth of plants; and on the other hand a closed circulation system for circulating heat-transporting liquid, to which heat absorbed by said one wall has been transferred, said system comprising said intermediate space or spaces, a heatstorage reservoir which is separate from said circulation system, a pump means, and liquid flow circuit means connecting said pump means between said reservoir and said space of spaces.

11. An installation according to claim 10 wherein, at least in that portion which is directed towards the sun, the roofing structure is composed of at least two superposed layers of transparent recessed panels in which said heat-transporting liquid is circulated and between which is intercalated a layer forming a filter which selectively absorbs radiations having a wavelength which exceeds a threshold value within the range of 6000 Å to 7500 Å according to the species of plants under cultivation.

12. An installation for the plant temperature control by radiant energy in an enclosure in which plants are cultivated, wherein said installation comprises in combination on the one hand an enclosure in which at least part of said enclosure is comprised of at least two walls delimiting at least one intermediate space filled with a heat-transporting liquid, each of the walls and liquid being at least partially transparent to solar radiation, one of the walls being formed of a material which contains an additive which operates to constitute an optical filter which absorbs radiant energy having a wavelength exceeding a threshold value lying within the range of 6000 Å to 7500 Å and having no usefulness for that growth of plants; and on the other hand a closed circulation system for circulating heat-transporting liquid to which heat absorbed by said one wall has been transferred, said system comprising said intermediate space or spaces, a heat-storage reservoir which is separate from said circulation system, and a pump means, said enclosure having a roofing structure formed of recessed panels at least in that portion which is directed towards the sun, said panels being formed of transparent plastic material and placed in end-to-end relation so that the recesses constitute ducts in which a heat-transporting liquid is circulated.

13. An installation according to claim 12, wherein said ducts are connected in parallel to a supply collector and to a return collection forming part of a closed-circuit system comprising a heat-storage reservoir and a pump.

14. An installation for the plant temperature control by radiant energy in an enclosure in which plants are cultivated, wherein said installation comprises in combination on the one hand an enclosure in which at least part of said enclosure is comprised of three walls delimiting between them two intermediate space filled with a heat-transporting liquid, each of the walls and liquid being at least partially transparent to solar radiation, the central wall being formed of a material which contains an additive which operates to constitute an optical filter which absorbs radiant energy having a wavelength exceeding a threshold value lying within the range of 6000 Å to 7500 Å and having no usefulness for that growth of plants; and on the other hand a closed circulation system for circulating heat-transporting liquid to which heat absorbed by said central wall has been transferred, said system comprising said intermediate spaces, a heat-storage reservoir which is separate from said circulation system, and a pump means.

15. An installation according to claim 14, wherein said installation comprises means whereby the heat-transporting liquid contained in the external intermediate space is removed during the night and when the wind is blowing at a velocity which exceeds a predetermined value.

16. A method of day and night air-conditioning of an enclosure in which plants are cultivated, at least part of the roofing structure of said enclosure being made up of at least two walls delimiting an intermediate space which is filled with a heat-transporting liquid, each of the walls and liquid being at least partially transparent to solar radiation, wherein:
during the daytime, the penetration of the solar energy within said enclosure is selectively limited by making use of an optical filter constituted by one of said walls which is formed of a material which contains on additive for selectively absorbing all radiant energy of wavelengths exceeding a threshold value that lies within the range of 6000 Å to 7500 Å and having no potential usefulness for the productivity and growth of the plants, at the same time permitting the greater part of the solar radiant energy that is potentially useful to green plants to be absorbed by the leaves of the plants under cultivation,
during the daytime, the heat absorbed by said one wall containing the additive is transferred to said liquid which is circulated in a closed circuit and is stored in a reservoir which is separate from the space formed between said walls,
during the night, a minimum temperature is maintained within the enclosure by circulating said liquid within said intermediate space.

17. An installation for the plant temperature control by radiant energy in an enclosure in which plants are cultivated, wherein said installation comprises in combination on the one hand an enclosure in which at least part of said enclosure is comprised of at least two walls delimiting at least one intermediate space filled with a heat-transporting liquid, each of the walls and liquid being at least partially transparent to solar radiation, one of the walls being formed of a material which contains an additive which operates to constitute an optical filter which absorbs radiant energy having a wavelength exceeding a threshold value lying within the range of 6000 Å to 7500 Å and having no usefulness for the growth of plants; and on the other hand a closed circulation system for circulaing heat-transporting liquid to which heat absorbed by said one wall has been transferred, said system comprising said intermediate space or spaces, a heat-storage reservoir which is separate from said circulation system, and a pump means, said enclosure having a roofing structure wherein, at least in that portion which is directed towards the sun, the roofing structure is composed of at least two superposed layers of transparent recessed panesl in which said heat-transporting liquid is circulated and between which is intercalated a layer forming a filter which selectively absorbs radiations having a wavelength which exceeds a threshold value within the range of 6000 Å to 7500 Å according to the species of plants under cultivation.

* * * * *